United States Patent [19]

Whitmore

[11] Patent Number: 5,130,871
[45] Date of Patent: Jul. 14, 1992

[54] DISK DRIVE WITH ROTATABLE DIAMOND-SHAPED ACTUATOR ARM

[75] Inventor: Robert W. Whitmore, Bloomington, Minn.

[73] Assignee: Seagate Technology, Inc., Scotts Valley, Calif.

[21] Appl. No.: 558,564

[22] Filed: Jul. 26, 1990

[51] Int. Cl.⁵ .............................................. G11B 21/16
[52] U.S. Cl. .................................................. 360/104
[58] Field of Search ........................ 360/104, 103, 105

[56] References Cited

U.S. PATENT DOCUMENTS

| | | | |
|---|---|---|---|
| 3,812,535 | 5/1974 | Higgins et al. | 360/103 |
| 4,004,081 | 1/1977 | Zorn et al. | 360/103 X |
| 4,175,275 | 11/1979 | Schaefer | 360/104 |
| 4,189,759 | 2/1980 | Bauck et al. | 360/104 |
| 4,346,416 | 8/1982 | Riggle et al. | 360/106 |
| 4,996,616 | 2/1991 | Aoyagi et al. | 360/103 X |

FOREIGN PATENT DOCUMENTS

| | | | |
|---|---|---|---|
| 56-137553 | 10/1981 | Japan | 360/104 |
| 60-205878 | 10/1985 | Japan | 360/104 |
| 61-42788 | 3/1986 | Japan | 360/104 |
| 62-262215 | 11/1987 | Japan | 360/104 |
| 2-185775 | 7/1990 | Japan | 360/104 |

Primary Examiner—John H. Wolff
Attorney, Agent, or Firm—Kinney & Lange

[57] ABSTRACT

A disk drive having an actuator arm for positioning a magnetic recording head over a magnetic surface is disclosed. The actuator arm has a supported end for connection to a rotatable shaft and a free end opposite the supported end for supporting a flex arm and a magnetic recording head/gimbal assembly. Between the supported end and free end is a tapered body including a first major surface extending from the proximal end to the distal end, a second major surface extending from the proximal end to the distal end, and first and second longitudinal edges. The body is thicker at the proximal end than at the distal end, and is thicker along its central longitudinal axis than at the first and second longitudinal edges.

10 Claims, 2 Drawing Sheets

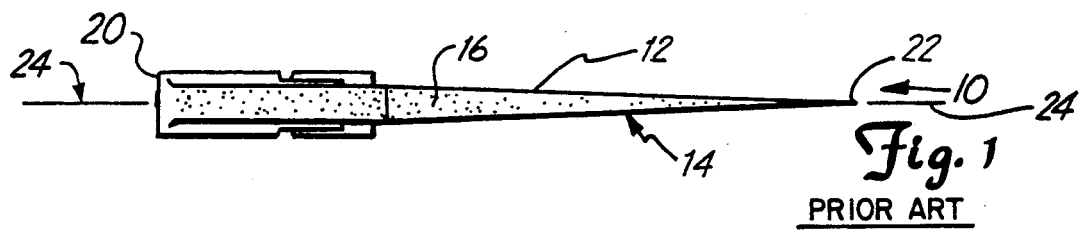
Fig. 1 PRIOR ART
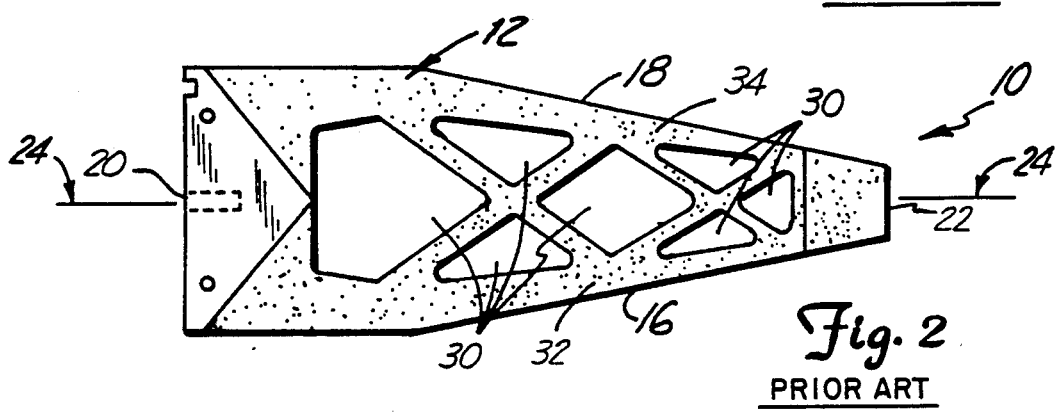
Fig. 2 PRIOR ART
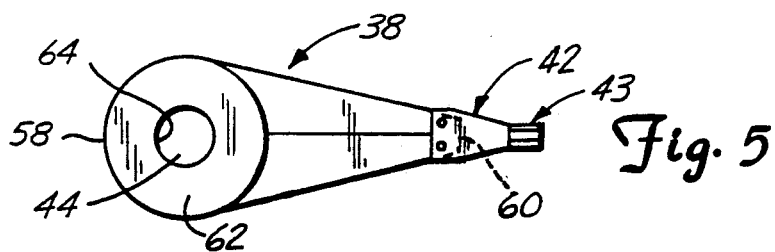
Fig. 5
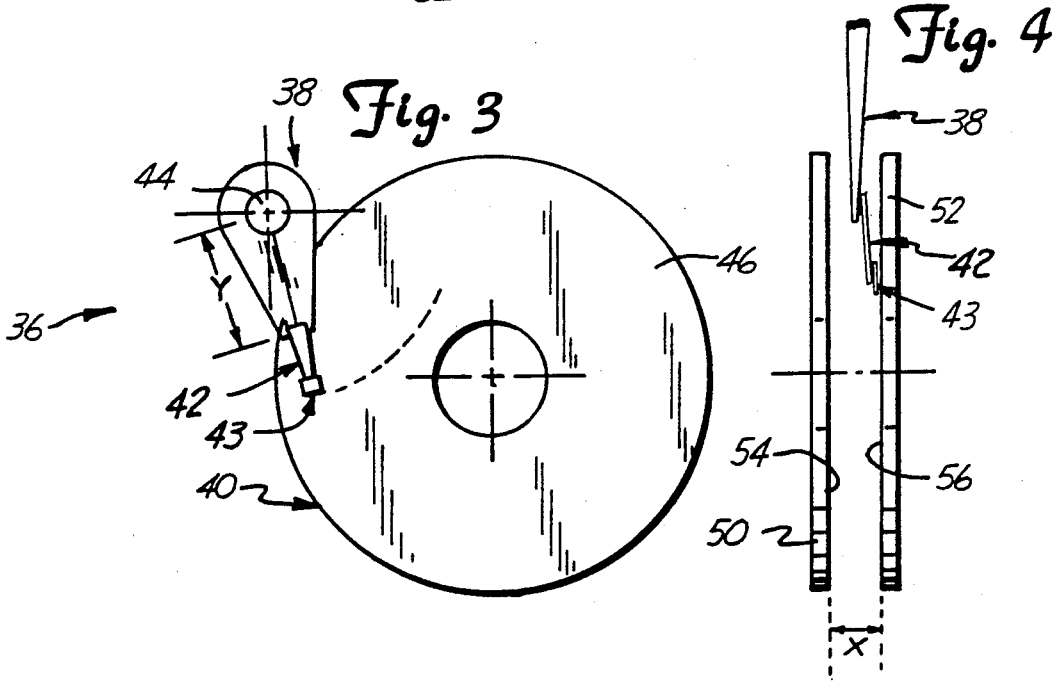
Fig. 3
Fig. 4

DISK DRIVE WITH ROTATABLE DIAMOND-SHAPED ACTUATOR ARM

BACKGROUND OF THE INVENTION

This invention relates to digital electronic recording and, in particular, to disk drive recording systems. More precisely, the invention relates to a disk drive having a rotatable actuator arm for positioning a magnetic recording head over the tracks of a disk.

A rotary actuator assembly of a hard disk file includes one or more actuator arms which are supported at one end and carry a transducer at the opposite (free) end. In order to move the transducer from track to track on a disk surface, the height of the actuator arm must be small enough to pass between two closely spaced magnetic disks.

The height between disks (assuming the recording disks are positioned horizontally) in a multiple-disk file is very limited. For this reason, an actuator arm must have a low profile from top to bottom. For example, FIG. 1 shows a side elevational view of the prior art actuator arm 10 disclosed in Riggle et al. U.S. Pat. No. 4,346,416. This actuator arm 10 has a relatively low height, compared to the width of the arm shown in FIG. 2.

Actuator arms used with rotary actuators must have sufficient stiffness in the directions of yaw, bending and torsion. "Yaw" motion is defined as deflection in a direction parallel to the disk surface. "Bending" motion is defined as deflection in a direction normal to the disk surface. "Torsional" motion for purposes of this disclosure is defined as a twisting motion about a central longitudinal axis 24 of the actuator arm (shown in FIGS. 1 and 2). The central axis 24 extends from a point central to the supported end 20 to a point central to the opposite, or free end 22. By providing sufficient stiffness in each of the above mentioned directions, vibration in the actuator arm is reduced, allowing the attached transducer to more quickly access data on the disk surface.

Improvements have been made to increase the stiffness in the directions of yaw and bending by providing actuator arms having upper, lower, and side surfaces which taper inwardly (converge) toward the central longitudinal axis from the attached end 20 to the free end 22.

A side elevational view of such a prior art actuator arm as disclosed in Riggle et al. U.S. Pat. No. 4,346,416 is shown in FIG. 1. The actuator arm has a pair of side surfaces 16 and 18 (shown in FIG. 2) which are wider at the attached end 20 than at the free end 22, and which taper inwardly (converge) toward a central longitudinal axis 24 extending from a point central to the attached end 20 to a point central to the free end 22.

The tapered side surfaces 16 and 18 provide improved yaw stiffness, as compared to substantially rectangular shaped side surfaces (not shown). Because the side surfaces 16 and 18 are tapered, the actuator arms of the prior art are also thicker from the upper surface 12 to the lower surface 14 at the attached end 20 as compared to the free end 22.

Although the actuator arm is thicker near the attached end 20 than at the opposite end 22, the prior art actuator arm 10 is the same thickness at the center as at the side surfaces 16 and 18, when each of the measuring points are located on a plane perpendicular to the central longitudinal axis 24.

A top plan view of the same prior art actuator arm is shown in FIG. 2. The prior art actuator arm 10 also includes a tapered upper surface 12, and a tapered lower surface 14 (shown in FIG. 1). Each surface 12 and 14 is wider at the supported end 20 than at the free end 22. Each surface 12 and 14 tapers inwardly (converges) toward the central longitudinal axis 24 from the supported end 20 toward the free end 22. Because of the tapered shape of surfaces 12 and 14, the free (opposite) end has a smaller width from side to side than the width of the attached end 20. The tapered surfaces 12 and 14 provide improved bending stiffness to the arm 10, as compared to untapered, substantially rectangular surfaces (not shown).

Because the four exterior surfaces 12, 14, 16, and 18 are each tapered, the mass of the prior art actuator arm is more concentrated near the supported end 20 of the actuator arm 10 than at the free end 22. An actuator arm having more of the mass concentrated at the supported end has a lower mass moment of inertia as compared to an actuator arm having less than four tapered surfaces. An actuator arm with a lower mass moment of inertia is capable of more rapid acceleration, which allows the disk drive to read and write data more rapidly. The mass moment of inertia of the prior art actuator arm is further reduced by reducing the mass of the arm with a series of cut-outs 30 which define side support members 32 and 34.

Although the prior art actuator arms have attempted to provide adequate stiffness in the directions of yaw and bending, these actuator arms do not have the maximum degree of stiffness possible for the given space limitations. In addition, the prior art actuator arm is not sufficiently resistant to torsional bending, which is known to have a negative effect on disk drive performance. Torsional bending, for example, is known to cause instability in the operation of the transducers.

Actuator arms with adequate stiffness in each direction of bending, torsion and yaw have a relatively high resonant frequency in each direction. If the resonant frequency is too low, large amplitude motions can be excited, causing read/write or servo errors.

The prior art actuator arm structure shown in FIGS. 1 and 2 does not achieve the maximum stiffness possible in the directions of bending, yaw and torsion for the given space limitations.

SUMMARY OF THE INVENTION

The present invention is a disk drive having an actuator arm for positioning a magnetic recording head near the surface of a magnetic recording disk, which has improved stiffness in the directions of torsion, yaw and bending motion. The actuator arm of the present invention has a supported end, a free end, and a body extending from the supported end to the free end. The body includes a first major surface, a second major surface, and two longitudinal edges, each edge and surface extending from the attachable end to the opposite end.

The first major surface and the second major surface are tapered such that the body is wider and thicker at the supported end than the free end. Each portion of the body located along a central longitudinal axis is thicker near the centerline than at the longitudinal edges.

BRIEF DESCRIPTION OF THE DRAWINGS

FIG. 1 is a side elevational view of a prior art actuator arm.

FIG. 2 is a top plan view of a prior art actuator arm.

FIG. 3 is a top plan view of a disk stack used in combination with the actuator arm of the present invention.

FIG. 4 is a side elevational view of a disk stack.

FIG. 5 is a top plan view of an actuator arm of the present invention and a magnetic recording head/gimbal assembly.

DETAILED DESCRIPTION OF THE PREFERRED EMBODIMENT

Figure 6:
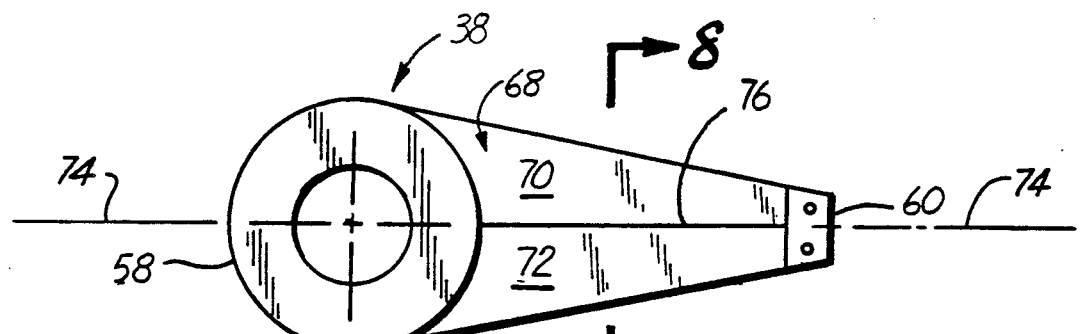
FIG. 6 is a top plan view of an actuator arm of the present invention.

The following definitions are provided for a more complete understanding of the present invention.

"Yaw" motion is defined as deflection in a direction parallel to the disk surface.

"Bending" motion is defined as deflection in a direction normal to the disk surface.

"Torsional" motion for purposes of this disclosure is defined as a twisting motion about a central longitudinal axis.

"Central longitudinal axis" is an axis extending from a point central to the supported end of an actuator arm to a point central to the opposite end, or free end.

The present invention provides a tapered actuator arm for a hard disk file, having a structure which is stiffer in the directions of yaw, bending, and torsion motion, compared to prior art actuator arms.

It was discovered that an actuator arm that is thicker near a central longitudinal axis of the actuator arm, as compared to the side edges of the actuator arm, each point being located in a plane substantially perpendicular to the central longitudinal axis, is stiffer in the directions of bending, yaw and torsion, as compared to the prior art actuator arms.

One of the advantages of increasing the stiffness in each of the above directions is that the resonant frequency of the arm is increased in each of the above-mentioned directions. Actuator arms having increased resonant frequency in each direction dampen vibratory motion more rapidly, and allow the magnetic recording head to more rapidly access the recording media.

For example, to access data stored on a magnetic disk, the actuator arm must rapidly move the magnetic recording head to the correct track on the disk surface. The necessary rapid acceleration may cause the actuator arm to vibrate. Increasing the resonant frequency of the arm reduces the degree of vibrational movement of the arm. A stiffer actuator arm also dampens vibration in a shorter period of time, and more rapidly accesses and/or writes data.

FIG. 3 shows a top plan view of hard disk file 36. The hard disk file 36 has incorporated into the structure at least one actuator arm 38 of the present invention. The hard disk file has a disk platter assembly 40, a flex arm 42 mounted onto an actuator arm 38 and a magnetic recording head/gimbal assembly 43 connected to the flex arm 42. The actuator arm 38 is mounted on an actuator motor shaft 44. The actuator arm 38 positions the magnetic recording head/gimbal assembly 43 on a particular track on a disk surface 46 by pivoting about the central axis 48 (shown in FIG. 7) of the actuator shaft 44. The effective length or reach of the actuator arm 38, shown as dimension Y, can be varied to correspond with the diameter of the disk.

The disk platter assembly 40 of a preferred embodiment has two disks 50 and 52, as shown in FIG. 4. However, the present invention is not limited to a hard disk file having two disks. In a multiple disk application, the actuator arm 38 thickness (top surface to bottom surface) is limited by the distance between adjacent disk surfaces, the dimension X between surfaces 54 and 56 of disks 50 and 52, for example.

A top plan view of the preferred embodiment of the actuator arm 38 of the present invention in combination with a flex arm 42 and a magnetic recording head/gimbal assembly 43 is shown in FIG. 5. The actuator arm 38 has a supported end 58 and an opposite end, or free end 60. At the supported end 58 is a hub 62 having an aperture 64 for receiving the actuator motor shaft 44.

The flex arm 42 is carried at the free end 60, the free end 60 being opposite the supported end 58. The actuator arm 38 is preferably a rigid structure whose purpose is to connect the flex arm 42 and magnetic recording head/gimbal assembly 43 to the actuator motor shaft 44. The magnetic recording head/gimbal assembly 43 includes a read/write transducer.

The actuator arm 38 of the preferred embodiment is formed from die cast aluminum. Other suitable metals include aluminum alloys, magnesium alloys, and other solid materials having a relatively low density, and a high modulus of elasticity. The material in forming an actuator arm is selected to minimize the mass of the actuator arm, while maximizing stiffness.

A top plan view of the preferred embodiment of the actuator arm of the present invention is shown in FIG. 6. The first major surface 68 includes a first angled face 70 and a second angled face 72. Each angled face 70 and 72 is wider at the supported end 58 than at the free end 60, and is tapered. The most preferred embodiment includes two substantially planar angled faces 70 and 72.

Figure 7:
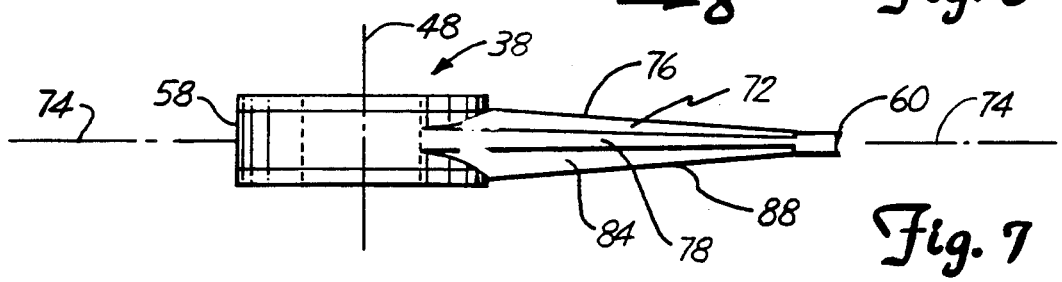
FIG. 7 is a side elevational view of the actuator arm of the present invention.

Each angled face 70 and 72 slopes downwardly from the supported end 58 toward the free end 60, and converges downwardly toward a central longitudinal axis 74 (as shown in FIG. 7). Each face 70 and 72 meets to form an upper edge 76 which causes the structure to be thicker near the central longitudinal axis 74 than at the edges 78 and 80, each point being located along a plane perpendicular to the axis 74.

Although the upper edge 76 in the preferred embodiment is a sharp edge, the invention contemplates rounded edges, for example. Also, the first major surface 68 can comprise a single curved surface, or any number of elongated tapered surfaces. Other configurations such as the ones mentioned above are possible, as long as the structure is thicker at the center than at the edges, each point located on a given plane perpendicular to the central longitudinal axis 74.

The first and second angled faces 70 and 72 are angularly disposed in the preferred embodiment at an angle less than 180 degrees, but greater than 90 degrees. The most preferred angle is about 140 degrees.

A side elevational view of the preferred embodiment of the invention is shown in FIG. 7. A first longitudinal edge 78 and a second longitudinal edge 80 (shown in FIG. 8) are each positioned substantially vertically, and are wider at the supported end 58 than at the free end 60. The edges 78 and 80 in the most preferred embodiment are planar faces. In another preferred embodiment, the edges 78 and 80 are sharply defined corners, each corner forming an angle of less than 90 degrees. In still another embodiment, the edges 78 and 80 define a line which joins two curved surfaces, the angle between the surfaces being 180 degrees.

Each of the edges 78 and 80 in the most preferred embodiment are tapered and converge inwardly toward the central longitudinal axis 74. The tapered edges 78 and 80 provide improved yaw stiffness of the arm 38.

The actuator arm 38 of the present invention has a second major surface 82 (shown in FIG. 8) which is the lower surface. The second major surface in the most preferred embodiment is substantially identical to the first major surface 68. That is, the second major surface 82 includes a first angled face 84, a second angled face 86 (shown in FIG. 8) and a lower edge 88. The lower angled faces 84 and 86 are substantially planar, and taper inwardly (converge) from the supported end 58 to the free end 60 toward the central longitudinal axis 78.

Figure 8:
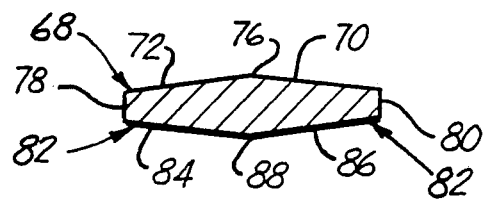
FIG. 8 is a cross sectional view of the most preferred embodiment of actuator arm taken along line 8—8 as shown in FIG. 6.

FIG. 8 illustrates a cross-sectional view of the actuator arm 38 of the most preferred embodiment of the present invention taken along line 8—8 in FIG. 6. As described above, the actuator arm 38 of the illustrated preferred embodiment has two upper angled faces 70 and 72, two lower angled faces 84 and 86, and two longitudinal edges 78 and 80. Each surface 70, 72, 78, 80, 84 and 86 is wider at the supported end 58 than at the free end 60 and is tapered. That is, each of the surfaces converge toward the central longitudinal axis 74 of the actuator arm (shown in FIGS. 6-7).

The cross-sectional view shown in FIG. 8 is within a plane which is substantially perpendicular to the central longitudinal axis 74. As can be seen from the cross-sectional view, for each selected point on the central longitudinal axis 74 (shown in FIG. 7), the structure is thicker near the central axis than at the edges 78 and 80. The cross-sectional view shown in FIG. 8 illustrates that the actuator arm of the preferred embodiment has six mutually nonorthogonal surfaces. That is, each of the surfaces forms an angle not equal to 90 degrees with an adjacent surface.

Although the preferred embodiment has six tapered surfaces 70, 72, 78, 80, 84 and 86 which provide greater stiffness in the direction of torsion, bending and yaw motion, the present invention contemplates any actuator arm which is tapered from the supported end 58 toward the free end 60, and which is thicker near the central longitudinal axis than at the edges, as measured in a plane perpendicular to the central longitudinal axis 74.

Figure 9:
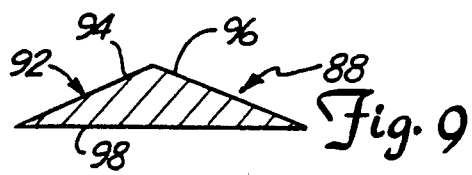
FIG. 9 is a cross-sectional view of a second preferred embodiment of an actuator arm taken along a line identical to the line 8—8 as shown in FIG. 6.

For example, FIG. 9 illustrates a cross-section of a second preferred embodiment of the present invention. The actuator arm 88 includes a first major surface 92 having a first angled face 94 and a second angled face 96. Each face 94 and 96 is substantially planar. In FIG. 9, the cross-sectional view is within a plane which is substantially perpendicular to the central longitudinal axis. The view is also taken along a line identical to line 8—8 shown in FIG. 6. The arm 88 has a second major surface 98 which in this example is a planar face. Each of the surfaces 94, 96 and 98 are wider at the supported end than at the free end, and are tapered (converge) toward a central longitudinal axis. The cross sectional view of FIG. 9 shows that this embodiment has three mutually nonorthogonal faces.

Figure 10:
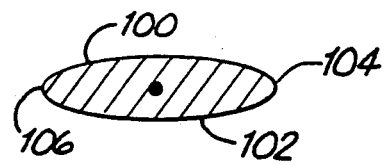
FIG. 10 is a cross-sectional view of a third preferred embodiment of an actuator arm taken along a line identical to the line 8—8 as shown in FIG. 6.
Figure 11:
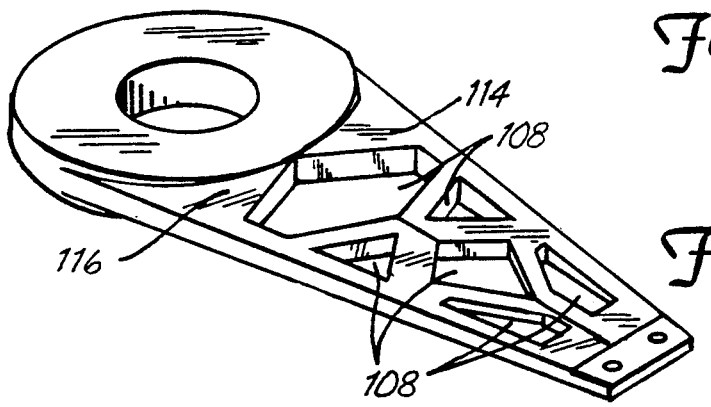
FIG. 11 is a perspective view of an actuator arm of the present invention having cut out portions.

In still another preferred embodiment, the first and second major surfaces are curved. FIG. 10 is a cross-sectional view of an actuator arm, the view taken along a line identical to the position of the line 8—8 as shown in FIG. 6. The first and second major surfaces 100 and 102 are convex, and meet at a first longitudinal edge 104 and a second longitudinal edge 106.

It was surprisingly discovered that by providing a physical structure which concentrates more of the mass near the central longitudinal axis of the actuator arm, causing the actuator arm to be thicker along the central axis than at the edges, the yaw, bending and torsional stiffness of an actuator arm was greatly improved. For example, the six sided actuator arm of the preferred embodiment was much stiffer in the directions of yaw, bending and torsional motion than prior art actuator arms.

A computer model was used to simulate the performance of the most preferred embodiment of the actuator arm. The most preferred embodiment had six tapered surfaces extending from the supported end to the free end. Resonant frequencies were computed in the directions of bending (one wavelength and ½ wavelength), torsion and yaw using the model.

A prototype of the six tapered surface model was built, and actual resonant frequencies were measured in each of the above mentioned directions. The resonant frequencies of a prior art actuator arm having top and bottom tapered surfaces, as well as two tapered side surfaces were measured for purposes of comparison. The prior art actuator arm had the same overall height at the center as well as at the edges, the height measurements being taken in a plane positioned perpendicular to the central longitudinal axis. Stated another way, a cross-sectional view of such a prior art actuator arm taken along a line identical to line 8—8 in FIG. 6 would be of a rectangular shape.

The Table is a summary of data comparing the resonant frequency of a theoretical actuator arm of the present invention having six sides, a six-sided prototype and the four-sided actuator arm of the prior art. Higher resonant frequencies are an indication of improved stiffness.

The data show that the most preferred embodiment of the present invention has improved stiffness in the directions of bending, yaw and torsion. Especially significant is the vast improvement in torsional stiffness.

TABLE

| Actuator Arm | Resonant Frequency (Hertz) | | | |
| --- | --- | --- | --- | --- |
| | 1st Bending | 2nd Bending | Yaw | Torsion |
| Model | 2,020 | 8,200 | 11,200 | 11,500 |
| Prototype | 2,500 | 9,000 | 7,600 | 12,100 |
| Prior Art | 890 | — | 6,800 & 7,500 | 4,900 |

An actuator arm in accordance with the present invention may incorporate apertures or supports, as well as other techniques known in the art to lighten the structure and thereby reduce the mass of the arm. For example, FIG. 1; shows an actuator arm in accordance with the present invention, having a plurality of cut out portions 108 extending from the upper angled faces 110 and 112 through the lower angled faces 114 and 116 (not shown).

The present invention advantageously provides a rigid structure for interconnecting the flex arm 42 and the magnetic recording head/gimbal assembly 43 shown in FIG. 5 to the actuator motor shaft 44. The present invention increases the stiffness of the actuator arm 38 in the directions of bending, torsion, and yaw motion. Increasing the stiffness of the actuator arm in the directions of torsion, bending and yaw motion also increases the resonant frequencies of the arm which provide several performance benefits for the hard disk file. For example, the time required to dampen the arm vibration is reduced, decreasing the access time of the hard disk file. Also, a reduction in time required to dampen vibration reduces vibration of the magnetic recording head, and reduces the possibility of reading and writing errors.

Although the present invention has been described with reference to preferred embodiments, workers skilled in the art will recognize that changes may be made in form and detail without departing from the spirit and scope of the invention. For example, an actuator arm having a plurality of outwardly projecting ribs on the exterior surfaces is contemplated by the present invention.

What is claimed is:

1. A disk drive comprising:
    a magnetic disk having a surface upon which information can be read from and written to, the disk being rotatable about a disk axis;
    an actuator shaft rotatable about an actuator shaft axis which is substantially parallel to the disk axis;
    a transducer; and
    a rotatable actuator arm for positioning the transducer near the surface of the magnetic disk, the actuator arm having a proximal end connected to the actuator shaft, a distal end which supports the transducer, and an actuator arm body having a thickness and a width, a first longitudinal edge, and a second longitudinal edge, wherein the actuator arm body extends between the proximal and distal ends, wherein a central longitudinal axis runs from a center of the proximal end to a center of the distal end such that the central longitudinal axis is substantially perpendicular to and generally intersects the actuator shaft axis, wherein the actuator arm body tapers in four directions:
    in thickness from the proximal end to the distal end;
    in width from the proximal end to the distal end;
    in thickness from the central longitudinal axis to the first longitudinal edge; and
    in thickness from the central longitudinal axis to the second longitudinal edge.

2. The disk drive of claim 1 wherein the rotatable actuator arm has a six-sided cross-section in a plane perpendicular to the central longitudinal axis.

3. A disk drive comprising:
    a magnetic disk having a surface upon which information can be read from and written to, the disk being rotatable about a disk axis;
    an actuator shaft rotatable about an actuator shaft axis which is substantially parallel to the disk axis;
    a transducer; and
    a rotatable actuator arm for positioning the transducer near the surface of the magnetic disk, the actuator arm having a proximal end connected to the actuator shaft, a distal end which supports the transducer, and an actuator arm body which extends between the proximal and distal ends, wherein a central longitudinal axis runs from a center of the proximal end to a center of the distal end such that the central longitudinal axis is substantially perpendicular to and generally intersects the actuator shaft axis, the body having an upper major surface and a lower major surface which run above and below the central longitudinal axis, respectively, and a thickness between the major surfaces, the body having a first longitudinal edge and a second longitudinal edge which run on opposite sides of the longitudinal axis and a width between the longitudinal edges, the body being thicker and wider at the proximal end than at the distal end, the body being thicker at the central longitudinal axis than at the first and second longitudinal edges.

4. The disk drive of claim 3 wherein each longitudinal edge comprises a substantially planar longitudinal face.

5. The disk drive of claim 3 wherein:
    the actuator arm body continuously tapers in thickness from the proximal end to the distal end.

6. The disk drive of claim 3 wherein:
    the actuator arm body continuously tapers in thickness from the central longitudinal axis to the first and second longitudinal edges.

7. The disk drive of claim 3 wherein:
    the actuator arm body continuously tapers in width from the proximal end to the distal end.

8. The disk drive of claim 7 wherein:
    the actuator arm body continuously tapers in thickness from the proximal end to the distal end; and wherein
    the actuator arm body continuously tapers in thickness from the central longitudinal axis to the first and second longitudinal edges.

9. The disk drive of claim 8 wherein each longitudinal edge comprises a substantially planar longitudinal face.

10. The disk drive of claim 3 wherein:
    the actuator arm body is thicker and wider at the proximal end than at a longitudinal midpoint defined as being halfway between the proximal end and the distal end.

* * * * *